US011958787B2

(12) United States Patent
Golden et al.

(10) Patent No.: US 11,958,787 B2
(45) Date of Patent: Apr. 16, 2024

(54) TAPE CASTING COATING FOR CERAMIC MATRIX COMPOSITE

(71) Applicants: Rolls-Royce Corporation, Indianapolis, IN (US); Rolls-Royce High Temperature Composites, Inc., Cypress, CA (US)

(72) Inventors: Robert Alexander Sean Golden, Noblesville, IN (US); Sungbo Shim, Irvine, CA (US); Li Li, Carmel, IN (US); Taylor K. Blair, Indianapolis, IN (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 263 days.

(21) Appl. No.: 17/119,345

(22) Filed: Dec. 11, 2020

(65) Prior Publication Data
US 2021/0188723 A1    Jun. 24, 2021

Related U.S. Application Data

(60) Provisional application No. 62/951,662, filed on Dec. 20, 2019.

(51) Int. Cl.
C04B 41/52 (2006.01)
C04B 35/80 (2006.01)
C04B 41/00 (2006.01)
C04B 41/45 (2006.01)
C04B 41/50 (2006.01)
(Continued)

(52) U.S. Cl.
CPC ............ *C04B 41/522* (2013.01); *C04B 35/80* (2013.01); *C04B 41/0072* (2013.01); *C04B 41/009* (2013.01); *C04B 41/4521* (2013.01); *C04B 41/5024* (2013.01); *C04B 41/87* (2013.01); *C04B 41/89* (2013.01)

(58) Field of Classification Search
CPC ... C04B 2237/58; C04B 37/001; C04B 35/80; C04B 41/89; C04B 41/87; C04B 41/5024; C04B 41/4521; C04B 41/009; C04B 41/0072; C04B 41/522
See application file for complete search history.

(56) References Cited

U.S. PATENT DOCUMENTS 6,485,590 B1    11/2002  Ivkovich, Jr. et al.
8,173,206 B2    5/2012   Boutwell et al.
9,701,072 B2 *  7/2017   Corman .................. F01D 5/005
(Continued)

*Primary Examiner* — Alex B Efta
(74) *Attorney, Agent, or Firm* — Shumaker & Sieffert, P.A.

(57) ABSTRACT

The disclosure describes braze tape coatings and technique to form articles with differing physical properties in different layers or regions of the article. An example method includes forming a braze tape defining at least one layer that includes a first segment and a second segment. A portion of the second segment in the plane is adjacent to a portion of the first segment in a plane of the layer. The method also includes positioning the braze tape on a surface of a substrate, the plane of the layer of the braze tape being parallel to the surface of the substrate. The method also includes heating the braze tape to melt a constituent of at least one of the first coating material and the second coating material to form a densified coating on the surface of the substrate.

15 Claims, 5 Drawing Sheets

(51) Int. Cl.
*C04B 41/87* (2006.01)
*C04B 41/89* (2006.01)

(56) References Cited

U.S. PATENT DOCUMENTS

| | | | |
|---|---|---|---|
| 2009/0162539 A1* | 6/2009 | Boutwell | B23P 6/005 |
| | | | 427/140 |
| 2009/0162556 A1 | 6/2009 | Boutwell et al. | |
| 2009/0162674 A1 | 6/2009 | Boutwell et al. | |
| 2010/0015396 A1 | 1/2010 | Johnson et al. | |
| 2011/0268956 A1* | 11/2011 | Fagoaga Altuna | C23C 4/126 |
| | | | 423/625 |
| 2016/0281514 A1* | 9/2016 | Ucasz | F01D 9/041 |
| 2020/0140345 A1* | 5/2020 | Whalen | C03C 8/16 |

* cited by examiner

TAPE CASTING COATING FOR CERAMIC MATRIX COMPOSITE

This application claims the benefit of U.S. Provisional Application Ser. No. 62/951,662, entitled "TAPE CASTING COATING FOR CERAMIC MATRIX COMPOSITE," and filed on Dec. 20, 2019, the entire content of which is incorporated herein by reference.

TECHNICAL FIELD

The present disclosure generally relates to tape cast coatings for ceramic matrix composites.

BACKGROUND

Substrates including a ceramic matrix composite (CMC) may be useful in a variety of contexts where mechanical and thermal properties are important, such as, for example, components in high-temperature mechanical systems, including gas turbine engines. Some substrates including a CMC may be coated with an overlying layer to reduce exposure of the substrate including a CMC to radiant heat or elements and compounds present in the operating environment of high-temperature mechanical systems.

SUMMARY

In some examples, the disclosure describes a method including forming a braze tape defining at least one layer extending in a plane. The at least one layer includes a first segment including a first coating material and a second segment including a second coating material. A portion of the second segment in the plane is adjacent to a portion of the first segment in the plane. The method also includes positioning the braze tape on a surface of a substrate. The plane of the layer of the braze tape is parallel to the surface of the substrate. The method also includes heating the braze tape to melt a constituent of at least one of the first coating material and the second coating material to form a densified coating on the surface of the substrate.

In some examples, the disclosure describes a component including a substrate and a coating system on a surface of the substrate. The substrate includes a ceramic matrix composite (CMC). The coating system includes at least one layer extending in a plane adjacent to the surface of the substrate. The at least one layer includes a first segment extending in the plane and including a first coating material, and a second segment extending in the plane and including a second coating material. A portion of the second segment is adjacent to a portion of the first segment.

In some examples, the disclosure describes a multilayer braze tape including a first layer and a second layer disposed on the first layer and extending in a plane. The second layer includes a first segment comprising a first coating material and extending in the plane and a second segment comprising a second coating material and extending in the plane. A portion of the second segment is adjacent to a portion of the first segment.

The details of one or more examples are set forth in the accompanying drawings and the description below. Other features, objects, and advantages will be apparent from the description and drawings, and from the claims.

DETAILED DESCRIPTION

Figure 1:
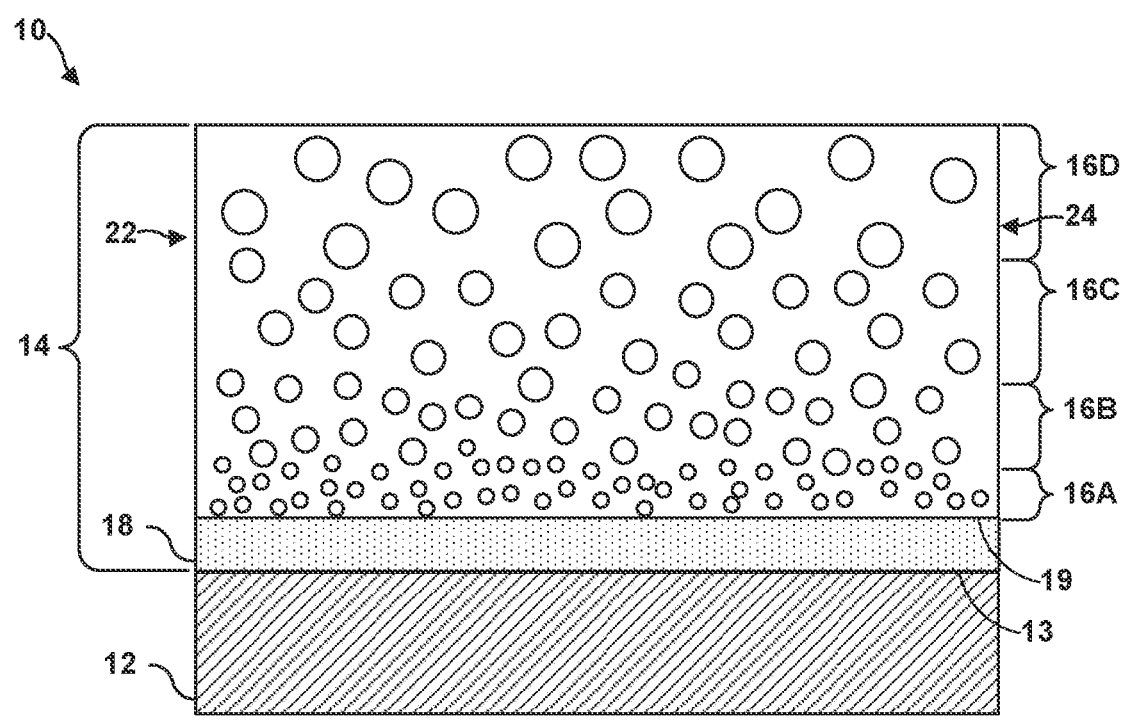
FIG. 1 is a conceptual diagram illustrating an example component that includes a substrate and a coating system on substrate, the coating system including a plurality of layers.

The disclosure describes articles including, and techniques for forming, tape cast coatings for ceramic matrix composite (CMC) components. An example tape cast coating may include a plurality of layers (e.g., layers normal to a surface of the CMC component) and/or a plurality of adjacent segments (e.g., within a plane parallel to the surface of the CMC component). Each layer of the plurality of layers and/or each segment of the plurality of adjacent segments may include a selected microstructure or chemistry. The selected microstructures and/or chemistries may be selected to improve a functionality at a selected positions on the CMC component. In some examples, a tape cast coating may be formed using at least one of slurry casting, tape casting, or gel casting. Each layer of the plurality of layers or each segment of the plurality of adjacent segments may be separately cast or cast with other layers or segments. Multiple cast layers or segments may be assembled to form the tape cast coating for positioning and sintering on a CMC component. The tape cast coating may be used, for example, to form a coating on CMC components or portions of CMC components that cannot be coated by other techniques (e.g., shadowed regions that cannot be coated by, for example, air plasma spray), and/or to repair damaged coatings.

Typically, coating systems for CMC components are applied using thermal spray processes, such as air plasma spray (APS). An example coating system may include, for example, a silicon-based bond coat, a rare earth silicate-based environmental barrier coating (EBC), and an abradable topcoat. Application of a coating system using APS has disadvantages including, but not limited to, preferential volatilization of elements/compounds, amorphous microstructure of as-deposited coating, lack of control of the coating microstructure, and limited ability of APS, as a line-of-sight technique, to coat components having shadowed regions or other complex geometries. Preferential volatilization of elements/compounds during spraying may result in the as-deposited coating chemistry being different than that of the coating feedstock powder. For example, silica in an ytterbium disilicate EBC may preferentially volatilize during spraying and result in a coating having various ytterbium monosilicate contents. As-deposited coatings that are amorphous may require a heat treatment to crystallize the coating. In some examples, the crystallization of the coating may result in significant cracking due to the volume change associated with the amorphous-to-crystalline transformation. For example, heat treatment of amorphous mullite may result in significant cracking, e.g., cracking to an extent that affects the chemical resistance or mechanical integrity of the coating. A "splat" microstructure may result from APS. Even with post-deposition processing, it may be difficult to control the coating microstructure including, for example, phase distribution, porosity, grain size, or the like.

The described techniques of forming coatings using a tape cast overcome these disadvantages of APS processes. For example, the chemistry of a tape cast coating does not change during processing. Hence, the desired coating chemistry can be controlled. Additionally or alternatively, a tape cast coating is not amorphous during processing. As such, coatings made from materials such as mullite can be produced with reduced cracking compared to amorphous materials. Additionally or alternatively, the microstructure of a tape cast coating may be tuned by controlling the chemistry, phase distribution, and/or grain size of the starting powders, controlling the solid loading in the slurry, and/or controlling the sintering conditions. Additionally or alternatively, the tape could be applied to components with complex geometries, such as shadowed regions, and/or be used to repair coatings that are damaged in service.

FIG. 1 is a conceptual diagram illustrating an example component 10 that includes a substrate 12 and a coating system 14 on substrate 12. Coating system 14 includes a plurality of overlying layers 16A-16D (collectively "layers 16"). In some examples, coating system 14 may include an optional bond coat 18. Component 10 may include a mechanical component operating at relatively high conditions of temperature, pressure, or stress, for example, a component of a turbine, a compressor, or a pump. In some examples, component 10 includes a gas turbine engine component, for example, an aeronautical, marine, or land-based gas turbine engine. Component 10 may include, for example, a blade, a blade track or blade shroud (or segment of a blade track or blade shroud) that circumferentially surrounds a rotating component, for example, a rotating blade 26.

Substrate 12 may include a material suitable for use in a high-temperature environment. In some examples, substrate 12 may include a ceramic or a ceramic matrix composite (CMC). Suitable ceramic materials may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous. In examples in which substrate 12 includes a CMC, substrate 12 may include a matrix material and a reinforcement material. The matrix material and reinforcement materials may include, for example, any of the ceramics described herein. The reinforcement material may be continuous or discontinuous. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the CMC includes an SiC matrix material (alone or with residual Si metal) and an SiC reinforcement material.

In some examples, substrate 12 includes a superalloy including, for example, an alloy based on Ni, Co, Ni/Fe, or the like. In examples in which substrate 12 includes a superalloy material, substrate 12 may also include one or more additives for improving the mechanical properties of substrate 12 including, for example, toughness, hardness, temperature stability, corrosion resistance, oxidation resistance, or the like. For example, the one or more additives may include titanium (Ti), cobalt (Co), or aluminum (Al).

In examples in which component 10 includes a turbine blade track, substrate 12 may define a leading edge 22 and a trailing edge 24. In some examples, leading edge 22 and trailing edge 24 may be substantially parallel to each other. In other examples, leading edge 22 and trailing edge 24 may not be substantially parallel to each other. In some cases, a first axis extending between leading edge 22 and trailing edge 24 may be in a substantially axial direction of a gas turbine engine including component 10 (e.g., parallel to the axis extending from the intake to the exhaust of the gas turbine engine). Thus, in some such cases, leading edge 22 and trailing edge 24 may be perpendicular or substantially perpendicular to the axial direction of the gas turbine engine including component 10.

Component 10 includes coating system 14 on a surface 13 of substrate 12. Coating system 14 may extend from leading edge 22 to trailing edge 24 of substrate 12. In some examples, coating system 14 may include a plurality of layers 16A-16D (collectively, "layers 16") and optional bond coat 18. In some examples, one or more of layers 16 may be formed on substrate 12 by the tape casting techniques described herein.

In some examples, bond coat 18 is disposed directly on an entirety of, or a portion of, surface 13 with no intermediate layers between substrate 12 and bond coat 18. In other examples, bond coat 18 may not be disposed directly on surface 13, i.e., one or more additional intermediate layers may be disposed between substrate 12 and bond coat 18, such as, for example, one or more impurity barrier layer. An impurity barrier layer may be configured to, for example, reduce migration of elements or compounds from substrate 12 to bond coat 18 or layers 16.

Bond coat 18 may include a composition that provides adherence between substrate 12 and a layer formed on bond coat 18, such as layer 16A. In some examples, the adherence provided by bond coat 18 between substrate 12 and layers 16 may be greater than the adherence between substrate 12 and layers 16, without bond coat 18.

In some examples, bond coat 18 may include a composition that may be stable at temperatures above 1350° C. and/or above about 1410° C. In this way, bond coat 18 may allow use of article 10 at temperatures which lead to temperatures of bond coat 18 above 1350° C. and/or above about 1410° C. In some examples, article 10 may be used in an environment in which ambient temperature is greater than the temperature at which bond coat 18 is thermally stable, e.g., because bond coat 18 may be coated with at least one layer, such as layers 16, that provides thermal insulation to bond coat 18 and reduces the temperature experienced by bond coat 18 compared to the ambient temperature or the surface temperature of the layer(s) formed on bond coat 18, e.g., layers 16.

Bond coat 18 may include silicon metal (e.g., elemental silicon; Si), a silicon-containing alloy, a silicon-containing ceramic, or a silicon-containing compound. In some examples, bond coat 18 may include a ceramic-based material including, but not limited to, rare earth monosilicate, rare earth disilicate, mullite, mullite blended with silicon, hafnon, hafnon blended with silicon, ytterbium disilicate, ytterbium disilicate blended with silicon, scandium disilicate, yttrium monosilicate and scandium monosilicate, combinations thereof, or the like. In some examples, the presence of Si in bond coat 18 may promote adherence between bond coat 18 and substrate 12, such as, for example, when substrate 12 includes silicon metal or a silicon-containing alloy or compound. In some examples, the presence of Si in bond coat 18 may reduce oxygen transport to substrate 12.

Bond coat 18 may optionally include at least one additive. The optional at least one additive may include, for example, at least one of a metal oxide, SiC, a melting point depressant, an oxidation enhancer, a transition metal carbide, a transition metal boride, or a transition metal nitride. SiC may affect the properties of bond coat 18. For example, SiC particles may modify oxidation resistance of bond coat 18, modify chemical resistance of bond coat 18, influence the coefficient of thermal expansion (CTE) of bond coat 18, or the like. In some examples, bond coat 18 may include between about 1 vol. % and about 40 vol. % SiC, such as between about 1 vol. % and about 20 vol. % SiC, or between about 5 vol. % and about 40 vol. % SiC, or between about 5 vol. % and about 20 vol. % SiC.

In examples in which bond coat 18 includes a melting point depressant, the melting point depressant may include a metal or alloy, such as at least one of zirconium metal, yttrium metal, titanium metal, aluminum metal, chromium metal, niobium metal, tantalum metal, or a rare earth metal. Rare earth metals may include Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples in which bond coat 18 includes a melting point depressant, bond coat 18 may include greater than 0 wt. % and less than about 30 wt. % of the melting point depressant, such as greater than 0 wt. % and less than about 10 wt. % of the melting point depressant. The melting point depressant may reduce a melting point of a bond coat precursor of bond coat 18 that is formed as part of the technique for forming bond coat 18. This may allow melting of the bond coat precursor at lower temperatures, which may reduce a chance that the melting of the bond coat precursor to form bond coat 18 damages substrate 12 or impurity barrier layer 14.

In examples in which bond coat 18 includes an oxidation enhancer, the oxidation enhancer may include at least one of molybdenum, hafnium, or ytterbium. In some examples in which bond coat 18 includes an oxidation enhancer, bond coat 18 may include greater than 0 wt. % and less than about 10 wt. % of the oxidation enhancer. The oxidation enhancer may facilitate formation of a stable oxide scale on a surface of bond coat 18, which may increase adhesion between bond coat 18 and layers 16, reduce diffusion of elements through bond coat 18, or both.

Bond coat 18 additionally or alternatively may include at least one of a transition metal carbide, a transition metal boride, or a transition metal nitride. Bond coat 18 may include silicon and at least one transition metal carbide; silicon and at least one transition metal boride; silicon and at least one transition metal nitride; silicon, at least one transition metal carbide, and at least one transition metal boride; silicon, at least one transition metal carbide, and at least one transition metal nitride; silicon, at least one transition metal boride, and at least one transition metal nitride; or silicon, at least one transition metal carbide, at least one transition metal boride, and at least one transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $Hfb_s$. The at least one transition metal nitride may include at least one of TiN, ZrN, HfN, Mo2N, or TaN.

In some examples, bond coat 18 may include between about 40 volume percent (vol. %) and about 99 vol. % silicon and a balance of the at least one of a transition metal carbide, a transition metal nitride, or a transition metal boride. In some examples, bond coat 18 may include between about 1 vol. % and about 30 vol. %, or between about 5 vol. % and about 20 vol. % of the at least one of a transition metal carbide, a transition metal boride, or a transition metal nitride, and a balance silicon metal and any additional constituents. The particular composition ranges may vary based on the CTE of the at least one of a transition metal carbide, a transition metal boride, or a transition metal nitride.

Transition metal carbides, transition metal borides, and transition metal nitrides may have a different CTE than silicon metal. For example, transition metal carbides and transition metal borides may have CTEs between about 5 ppm/° C. and about 8 ppm/° C., and transition metal nitrides may have CTEs of about 9 ppm/° C. By mixing silicon and a transition metal carbide, a transition metal boride, or transition metal nitride, the CTE of bond coat 18 may be increased to more closely match the CTE of substrate 12, the CTE of impurity barrier layer 14, the CTE of layers 16, or any combination thereof. This may reduce stress at the interfaces between bond coat 18 and adjacent layers during thermal cycling of article 10.

Additionally or alternatively, the addition of the at least one of the transition metal carbide, the transition metal boride, or the transition metal nitride may improve oxidation resistance of bond coat 18 compared to a bond layer including only silicon. For example, the at least one of the transition metal carbide, the transition metal boride, or the transition metal nitride may be incorporated into a thermally grown silicon oxide on a surface 24 of bond coat 18, which may improve adherence of the thermally grown silicon oxide to bond coat 18, decrease oxygen diffusivity through the thermally grown silicon oxide (which reduces the rate of oxidation of the remaining bond layer), or both.

Bond coat 18 may define any suitable thickness, measured in a direction substantially normal to surface 13 of substrate 12. In some examples, bond coat 18 defines a thickness of between about 0.5 mils (about 12.7 micrometers) and about 40 mils (about 1016 micrometers), such as between about 1 mils (about 25.4 micrometers) and about 10 mils (about 254 micrometers).

Bond coat 18 may be formed on substrate 12 using the tape casting techniques described herein. In examples in which bond coat 18 includes mullite, bond coat 18 formed by the tape casting techniques described herein may include reduced cracking compared to other bond coats formed using APS. In examples in which bond coat 18 includes hafnon and silicon, bond coat 18 formed by the tape casting techniques described herein may include improved oxidation resistance compared to other bond coats, e.g., formed by APS, having splat microstructures and/or a nonuniform distribution of the silicon, which may oxidize and result in spallation after heat cycling in an oxidizing environment.

In other examples, bond coat 18 may be formed on substrate 12 using, for example, thermal spraying, e.g., air plasma spraying (APS), high velocity oxy-fuel (HVOF) spraying, low vapor plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

As shown in FIG. 1, bond coat 18 defines a surface 19 on which layers 16 are disposed. Layers 16 may include, for example, one or more of an environmental barrier coating (EBC), an abradable layer, a thermal barrier coating (TBC), a calcia-magnesia-aluminosilicate (CMAS)-resistant layer, or the like. In some examples, a single layer of layers 16 may perform two or more of these functions. For example, an EBC may provide environmental protection, thermal protection, CMAS-resistance, and the like to substrate 12. As another example, an abradable layer may provide wear protection, impact protection, and the like to substrate 12. As illustrated in FIG. 1, component 10 includes a plurality of layers 16, such as at least one EBC layer, at least one abradable layer, at least one TBC layer, at least one CMAS-resistant layer, or combinations thereof. In some examples, one or more layers of layers 16 may include one or more of silicon, silica, mullite, barium strontium aluminosilicate, a rare earth oxide, a rare earth monosilicate, a rare earth disilicate, a mixture of a rare earth monosilicate and a rare earth disilicate, a mixture of a plurality of rare earth silicates, a mixture of a rare earth oxide and one or more rare earth silicates (e.g., a rare earth monosilicate and/or a rare earth disilicate), scandium oxide, scandium monosilicate, scandium disilicate, yttrium oxide, yttrium monosilicate, yttrium disilicate, hafnia, hafnon, zircon, mixtures thereof, or the like.

Layers 16 may be formed on surface 19 of bond coat 18 using the tape casting techniques describe herein. In other examples, one or more layers of layers 16 may be formed on surface 19 using, for example, thermal spraying, e.g., APS, HVOF spraying, low vapor plasma spraying; PVD, including EB-PVD, DVD, and cathodic arc deposition; CVD; slurry process deposition; sol-gel process deposition; electrophoretic deposition; or the like.

An EBC layer may include at least one of a rare earth oxide, a rare earth silicate, an aluminosilicate, an alkaline earth aluminosilicate, or metal oxides. In some examples, an EBC layer may include one or more dopants, such as CaO, MgO, $Al_2O_3$, $Fe_2O_3$, $Fe_3O_4$, $RE_2O_3$ (where RE is a rare earth element), $Y_2O_3$, $Sc_2O_3$, $Ta_2O_5$, $HfO_2$, ZrO, SrO, $LiREO_2$, or $RE_3Al_5O_{12}$ (e.g., YbAG or YAG). For example, an EBC layer may include mullite, BSAS, barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu, Yb, Tm, Er, Ho, Dy, Tb, Gd, Eu, Sm, Pm, Nd, Pr, Ce, La, Y, or Sc. In some examples, the one or more dopants may act as sintering aids to densify the EBC layer thereby increasing its hermeticity and/or decreasing the porosity compared to the porosity of a similar EBC deposited without the sintering aids.

In examples in which the EBC layer includes a mixture of a rare earth monosilicate and a rare earth disilicate or a mixture of a plurality of rare earth silicates, the mixture may include up to three RE cations with varying molar concentrations of the RE cation (e.g. $(Yb_{0.5}, Lu_{0.5})2SiO_5$, $(Yb_{0.5}, Lu_{0.5})2Si_2O_7$).

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, the additive may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to bond coat 18, may increase or decrease the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

Regardless of the composition of the EBC layer, in some examples, the EBC layer may have a dense microstructure, a porous microstructure, a columnar microstructure, or a combination of at least two of dense, porous, or columnar microstructures. A dense microstructure may be more effective in preventing the infiltration of CMAS and other environmental contaminants, while a porous or columnar microstructure may be more strain tolerant during thermal cycling. In some examples, an EBC layer with a dense microstructure may have a porosity of less than about 10 vol. %, such as less than about 8 vol. %, less than about 5 vol. %, or less than about 2 vol. %, where porosity is measured as a percentage of pore volume divided by total volume of the EBC layer. In some examples, an EBC layer with a porous microstructure may have a porosity of more than about 10 vol. %, such as more than about 15 vol. %, more than about 20 vol. %, or more than about 30 vol. %, where porosity is measured as a percentage of pore volume divided by total volume of the EBC layer.

As described above, the EBC layer may be used as a single layer 16 or may be used in combination with at least one other layer, such as an abradable layer or TBC layer.

Additionally or alternatively, layers 16 may include an abradable layer. Abradability may include a disposition to break into relatively small pieces when exposed to a sufficient physical force. Abradability may be influenced by the material characteristics of the abradable layer, such as fracture toughness and fracture mechanism (e.g., brittle fracture), as well as the porosity of the abradable layer. Thermal shock resistance and high temperature capability may be important for use in a gas turbine engine, in which the abradable layer is exposed to wide temperature variations from high operating temperatures to low environmental temperatures when the gas turbine engine is not operating. In addition to at least some of the above properties, the abradable layer may possess other properties.

The abradable layer may include any suitable material. For example, the abradable layer may include at least one of a rare earth oxide, a rare earth silicate, an aluminosilicate, or an alkaline earth aluminosilicate. For example, an abradable layer may include mullite, BSAS, BAS, SAS, at least one rare earth oxide, at least one rare earth monosilicate, at least one rare earth disilicate, or combinations thereof. In some examples, the abradable layer may include any of the compositions described herein with respect to the EBC layer.

The abradable layer may be relatively porous. For example, the abradable layer may have a porosity between about 10 vol. % and about 50 vol. %, such as between about 15 vol. % and about 35 vol. %, or about 20 vol. %. Porosity of the abradable layer may reduce a thermal conductivity of the abradable layer and/or may affect the abradability of the abradable layer. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a tape casting technique. Porosity of the abradable layer may be controlled by the use of coating material additives and/or processing techniques, such as by controlling heat treatment and/or material infiltration during tape casting, to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over substrate 12 to form the abradable layer. The coating material additive then may be melted or burned off in a post-formation heat treatment, or during operation of the gas turbine engine, to form pores in the abradable layer. The post-deposition heat-treatment may be performed at up to about 1600° C.

The porosity of the abradable layer can also be created and/or controlled during formation of a tape. For example, forming the tape may include application of a slurry of the coating material onto a carrier film using the tape cast machine, followed by drying and sintering or partial sintering. During sintering, the coating material may shrink. Shrinkage may result in crack formation. To reduce crack formation, the coating material may be partially sintered. The remaining porosity and/or cracks may be infiltrated with the same material or a different material. Partially sintering and infiltrating may be repeated until a selected porosity or resistance to cracking is achieved. For example, the additional infiltration and partial sintering steps may be performed several times to achieve a dense uncracked coating. In some examples, using a different material for infiltration may produce a composite coating structure with enhanced mechanical properties and environmental resistance. An example composite structure formed by partial sintering and infiltration may include ytterbium disilicate, ytterbium monosilicate, and/or hafnon with silicon.

As described above, the abradable layer may be used as a single layer 16 or may be used in combination with at least one other layer, such as an EBC layer or TBC layer.

Layers 16 additionally or alternatively may include a TBC layer. The TBC may have a low thermal conductivity (i.e., both/either an intrinsic thermal conductivity of the material(s) that forms the TBC and/or an effective thermal conductivity of the TBC as constructed) to provide thermal insulation to substrate 12, bond coat 18, and/or layers 16. Heat is transferred through the TBC through conduction and radiation. The inclusion of rare earth oxides such as ytterbia, samaria, lutetia, scandia, ceria, gadolinia, neodymia, europia, yttria-stabilized zirconia (YSZ), zirconia stabilized by a single or multiple rare earth oxides, hafnia stabilized by a single or multiple rare earth oxides, zirconia-rare earth oxide compounds, such as $RE_2Zr_2O_7$ (where RE is a rare earth element), hafnia-rare earth oxide compounds, such as $RE_2Hf_2O_7$ (where RE is a rare earth element), and the like as dopants may help decrease the thermal conductivity (by conduction) of the TBC.

As described above, the TBC layer may be used as a single layer 16 or may be used in combination with at least one other layer, such as an EBC layer or an abradable layer.

In some examples, coating system 14, e.g., layers 16 and/or bond coat 18, may conform to a three-dimensional geometry of component 10. In some examples, conforming to the three-dimensional geometry of component 10 may improve aerodynamics of component 10 and/or improve bonding of layers 16 and/or bond coat 18 to substrate 12.

As discussed above, coating system 14, e.g., layers 16 and/or bond coat 18, may be formed using slurry casting, tape casting, or gel casting. For example, a composition of layers 16 may be selected to enable partial sintering, sintering, or brazing of layers 16. Specific chemistries, slurry solid loadings, and/or sintering and infiltration conditions may be selected to achieve a coating system 14 with desired phase fractions and porosities. For example, as illustrated in FIG. 1, each of layers 16 may include a unique microstructure, a unique chemistry, and/or a unique slurry solid loading, and/or be formed using a unique sintering condition.

In some examples, layers 16 may each include a silicon-containing braze material. The silicon-containing braze material may include, for example, silicon metal, a silicon alloy, or silicon metal and an alloying element. In some examples, the silicon alloy may include silicon metal alloyed with transition metals, transition metal carbides, transition metal borides, transition metal silicides, or mixtures thereof. Similarly, the alloying element may include at least one of titanium, boron, carbon, or the like. The alloying element may modify the melting temperature of silicon, modify the viscosity or wetting characteristics of the melted alloy compared to molten silicon, or the like. The silicon metal, the silicon alloy, or the silicon metal and the alloying element may be present in the silicon-containing braze material as a particulate.

In some examples, layers 16 also may include a binder, which may assist in maintaining the silicon-containing braze material in the respective layers 16. In some examples, the binder may include a carbon-yielding organic binder system, for example, furan derived binders. The carbon-yielding organic binder system may be formed, for example, during slurry casting, tape casting, or gel casting of the respective layers 16.

In some examples, at least one of layers 16 may additionally include graphite, carbon black, diamond, or the like. The graphite, carbon black, diamond or the like may react with the silicon (e.g., silicon metal) to form silicon carbide.

In examples in which layers 16 include an EBC and an abradable coating, the composition of each layer of layers 16 may include selected ratios of ytterbium disilicate and ytterbium monosilicate. In some examples, the selected ratios of ytterbium disilicate and ytterbium monosilicate may improve water vapor and/or calcium oxide, magnesium oxide, aluminum oxide, and silicon oxide ("CMAS") resistance, and/or improve porosity for improved compliance and abradability.

In some examples, coating system 14, e.g., one or more of layers 16 and/or bond coat 18, may be formed by a casting technique, such as tape casting, slurry casting, or gel casting the layers of coating system 14. For example, each of the layers of coating system 14 may be separately casted, then joined to form coating system 14. As another example, a first layer (e.g., layer 16A) may be cast, a second layer (e.g. layer 16B) may be cast on the first layer, a third layer (e.g., layer 16C) may be cast on the second layer, and a fourth layer (e.g., layer 16D) may be cast on the third layer. Some example techniques for forming coating system 14 will be described below in further detail.

Although described above as being formed using tape casting, in some examples, one or more layers of coating system 14 may be formed by other techniques, such as, for example, thermal spraying, APS, chemical vapor deposition (CVD), or the like, with other layers applied using the tape casting techniques described herein. For example, bond coat 18 may be formed by tape casting and one or more of layers 16 may be formed by APS. As another example, bond coat 18 may be formed by APS and one or more layers 16 may be formed by tape casting an EBC. As another example, an impermeable barrier layer may be formed by CVD followed by a tape cast bond coat 18 and EBC layers 16, followed by an APS abradable layer.

Figure 2:
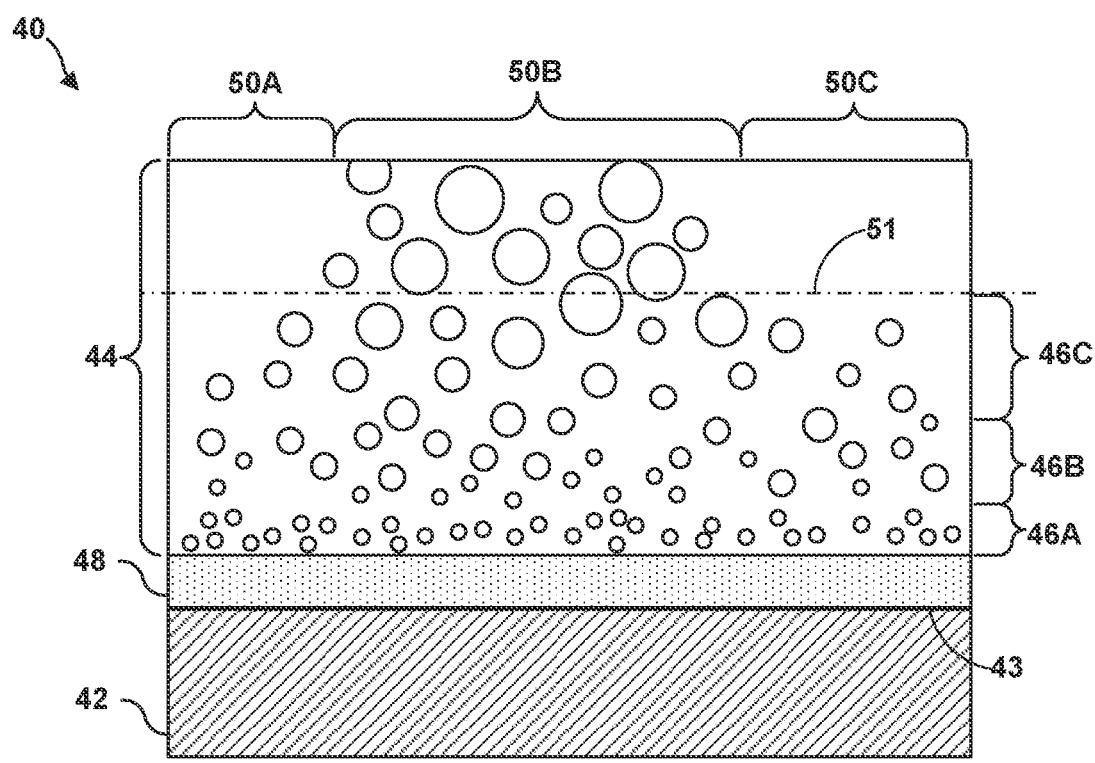
FIG. 2 is a conceptual diagram illustrating an example component that includes a substrate and a coating system on substrate, the coating system including a plurality of layers and a plurality of segments.

In some examples, adjacent segments of a tape may be selected to control a microstructure or chemistry, which may be positioned on the CMC component to improve a functionality at a selected portion of the CMC component, such as a selected portion of a surface of the CMC component. FIG. 2 is a conceptual diagram illustrating an example component 40 that includes a substrate 42 and a coating system 44 on substrate 42. Component 40 may be the same as or substantially similar to component 10 discussed above in reference to FIG. 1, expect for the differences described herein.

For example, coating system 44 includes a plurality of layers 46A, 46B, and 46C (collectively "layers 46") and a plurality of adjacent segments 50A, 50B, and 50C (collectively, "segments 50"). Layers 46 are arranged normal to surface 43 of substrate 42. Segments 50 are within a plane 51 parallel to surface 43 of substrate 42. Each layer of layers 46 and/or each segment of segments 50 may include a selected microstructure or chemistry. For example, layers 46 and segments 50 may include any of the coating materials discussed above in reference to FIG. 1. Additionally, segments 50 may be applied using the tape casting techniques discussed above. For example, a tape including one or more segments of segments 50 may be prepared, positioned on component 10, and sintered to define a densified coating of coating system 44.

In some examples, the selected microstructures and/or chemistries may be selected to improve a functionality at one or more selected positions on component 10. As one example, segments 50 may define a non-continuous abradable portion of coating system 44 of a gas turbine engine shroud that includes a first portion (e.g., segment 50A), a second portion (e.g., segment 50C), and a blade rub portion (e.g., segment 50B). Blade rub portion 50B may extend between first portion 52 and second portion 54, and may be configured to be abraded, e.g., by the tips of blades of a gas turbine engine, in order to form a relatively tight seal between component 40 and the blades. An abradability, as discussed above in reference to FIG. 1, of blade rub portion 50B may include a disposition to break into relatively small pieces, granules, or powder, when exposed to a sufficient physical force. Abradability may be influenced by the material characteristics of the material forming blade rub portion 50B of coating system 44, such as fracture toughness and fracture mechanism (e.g., brittle fracture) and/or the porosity of the blade rub portion 50B. In this way, a portion of coating system 44 over a region of component 10 may be controlled by application of different segments 50 via casting to improve mechanical and/or chemical properties of the portion of coating system 44.

In some examples, coating system 14 and/or 44 may be formed using one or more casting techniques. For example, each layer of coating system 14 or 44 may be formed using gel casting, slurry casting, or tape casting.

Figure 3:
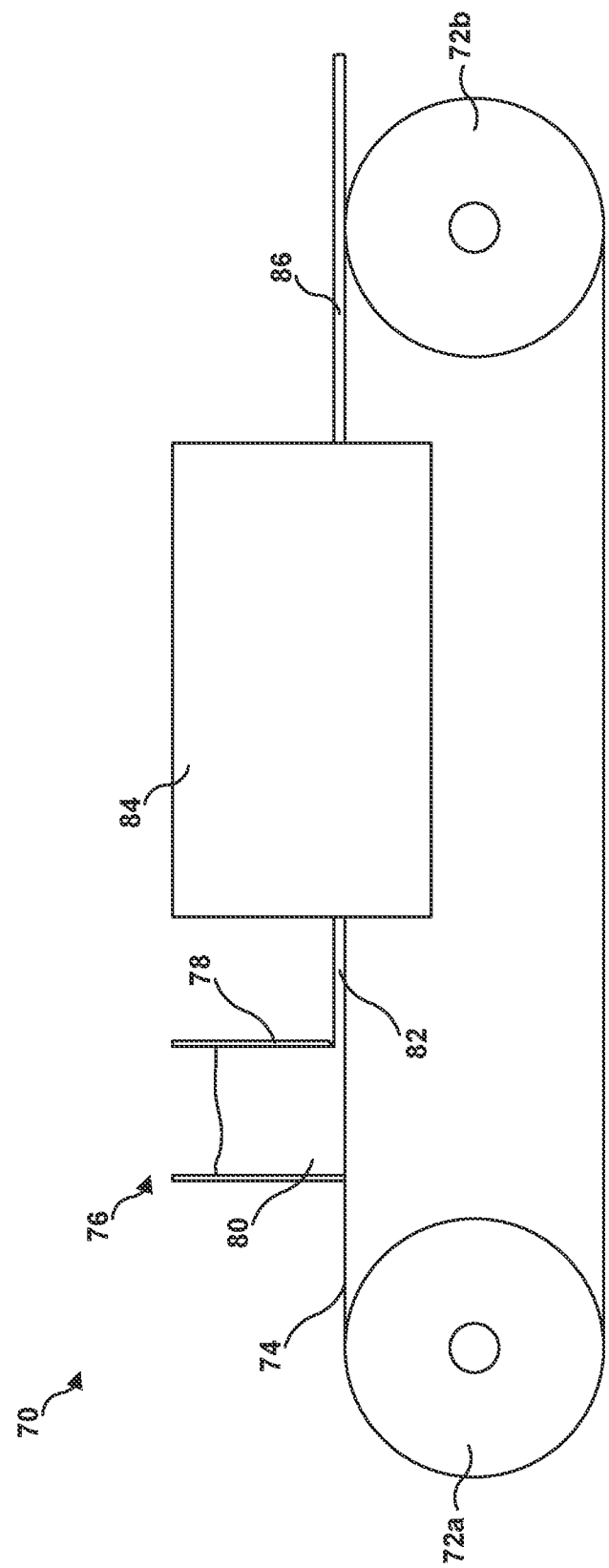
FIG. 3 is a conceptual diagram illustrating an example tape casting system.

FIG. 3 is a conceptual diagram illustrating an example tape casting system 70. Tape casting system 70 includes a first roller 72a and a second roller 72b (collectively, "rollers 72"). A belt 74 is carried by and rotates about the rollers 72. In some examples, belt 74 may include a nonstick material that has low adhesion to the tape 86 formed using tape casting system 70, such that tape 86 may easily separate from belt 74 without damaging the tape 86. In other examples, belt 74 may carry a release liner on which the tape 86 is formed. The release liner may be formed of any film that has relatively low adhesion to the material from which the tape is formed 86.

Tape casting system 70 also includes a reservoir 76, which contains a slurry 80. One wall 78 of reservoir 76 is raised from belt 74 and defines a gap, which sets the thickness of the slurry layer 82 formed on belt 74.

Slurry 80 may include components or precursors of tape 84 disposed in a solvent. For example, the slurry may include particles, a pre-gellant material, an optional gelation initiator or promoter, optional additives, and a solvent. The composition of the particles may depend on, for example, whether the tape 84 being formed includes a silicon-containing braze material or other coating material described above in reference to FIG. 1. In examples in which tape 84 includes a silicon-containing braze material, the particles may include, for example, silicon metal, a silicon alloy, or silicon metal and an alloying element.

The pre-gellant material may include any material that can be processed to form a gel-like network distribute and retain the particles within tape 84 as the tape 84 is subsequently processed. In this application, the term gel refers to a viscous, jelly-like colloid including a disperse phase of the particles.

In some examples, the pre-gellant material includes a polysaccharide such as, for example, methyl cellulose, carboxymethyl cellulose, hydroxypropyl methyl cellulose, gellan gum, xanthan gum, agarose, carrageenan, and mixtures and combinations thereof. In some examples, the slurry composition may optionally further include a gelation initiator or promoter such as a monovalent or a divalent salt.

In some examples, the pre-gellant material includes one or more gelation monomers which, when polymerized, form a gel. In various examples, the monomeric pre-gellant material may include, but are not limited to, acrylamides, acrylates, vinyls, allyls, and mixtures and combinations thereof. The gelation monomers may optionally include one, two, or more functional groups such as, for example, (meth) acryl, acrylamido, vinyl, allyl, and the like.

In some examples, the slurry can include an optional polymerization initiator to aid gelation of the pre-gellant material. The polymerization initiator may vary widely depending on the selected monomeric pre-gellant material, and in various example examples may include a peroxide, a persulfate, a perchlorate, an amine, an azo compound, and mixtures and combinations thereof.

The slurry also includes a solvent selected to disperse or dissolve the monomeric pre-gellant material and the optional polymerization initiator. In various examples, the solvent is aqueous (includes a major amount of water), or is water. Other solvents that can be used in the slurry include, but are not limited to, alcohols. In some examples, the slurry may optionally include less than about 10 weight percent (wt. %) of additives such as, for example, dispersants, binders, surfactants, pH adjustors, and the like.

In other examples, the slurry may include particles, a binder, and a solvent. For example, the slurry can include between about 40 vol. % and about 60 vol. % of particles, between about 10 vol. % and about 30 vol. % binder, optionally, up to about 40 vol. % additives, and between about 10 vol. % and about 20 vol. % of a solvent or mixture of solvents. As described above, in some examples, the binder may include an organic binder system. In some examples, the slurry additionally may include graphite, carbon black, diamond, or the like.

In operation, as rollers 72 rotate, belt 74 is moved in a clockwise direction under reservoir 76 and receives the slurry 80. The gap between wall 78 and belt 74 defines the thickness of slurry layer 82 on belt. Slurry layer 82 is carried by belt 74 through a furnace 84, which dries slurry layer 82 by removing the solvent from slurry layer 82. In some examples, heat from furnace 84 also may facilitate the gelation reaction in slurry layer 82. Exiting from furnace 84 is a tape 86. Due to the presence of the binder or gel, tape 86 may be at least somewhat flexible. In some examples, tape 86 may be rolled on a roller for storage and/or transport.

In some examples, instead of forming tape 86 using a single stage including a reservoir 76 and furnace 84, a tape casting system may form tape 86 using multiple stages, each stage including a respective reservoir and furnace. Additionally, or alternatively, each stage may include a plurality of reservoirs 76 positioned substantially adjacent to each other, each respective reservoir configured to dispense a respective slurry onto belt 74 (e.g., as adjacent segments 50), either simultaneously or nearly simultaneously in accordance with common tape casting techniques. Each stage may deposit one or more layers or segments onto belt 74 (or previously deposited layers or segments). Thus, in a single process, multiple layers may be sequentially formed, with each layer being dried before the next layer is formed. In this way, a single tape casting system may be used to form a coating system 14 or 44.

In other examples, a tape may be formed using gel casting or slurry casting. In both gel casting and slurry casting, a slurry may be formed. The slurry in gel casting may include any of the components described above (e.g., any of the pre-gellant materials). Similarly, the slurry in slurry casting may include particles, a binder, a solvent, and optionally, additives. The slurry may be deposited in a mold, which may define the shape of the tape. The slurry then may be dried to remove the solvent, and, in the case of gel casting, gelled, either during or after the slurry is dried.

Figure 4:
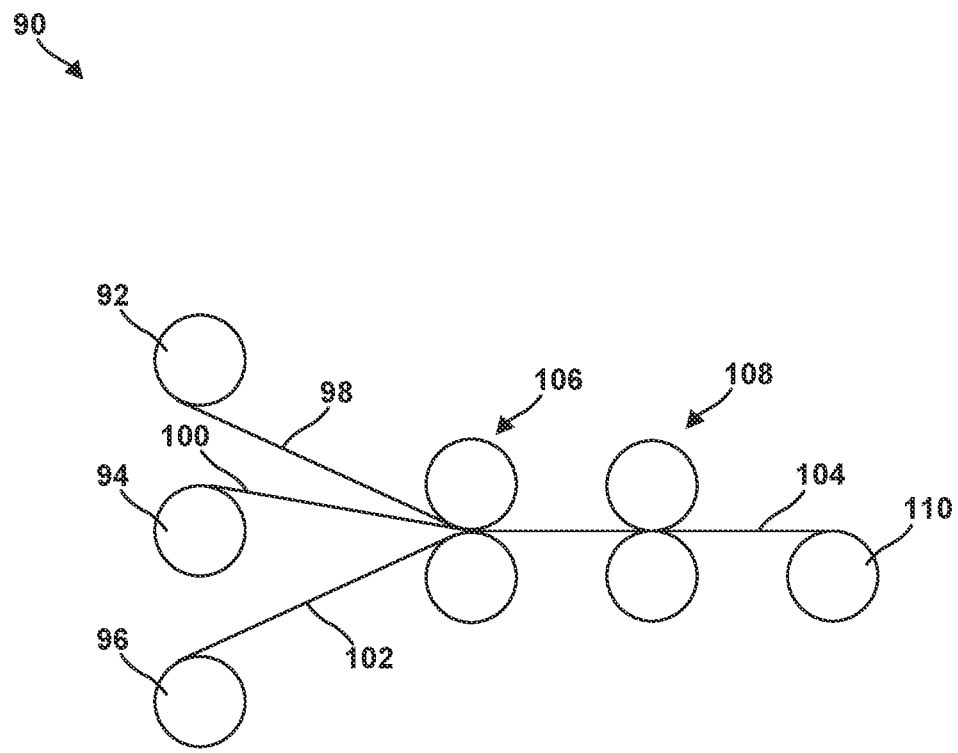
FIG. 4 is a conceptual diagram illustrating an example system for assembling a multilayer tape from multiple tapes.

In some examples, regardless if slurry, gel, or tape casting is used, each layer may be formed separately (e.g., as shown in FIG. 3). The resulting layers then may be combined to form a coating system 14 or 44. FIG. 4 is a conceptual diagram illustrating an example system 90 for assembling a multilayer tape 104 from multiple tapes 98, 100, and 102. As shown in FIG. 4, each tape 98, 100, and 102 is initially carried by a respective roller 92, 94, and 96. Each of tapes 98, 100, and 102 may include substantially similar or unique compositions, such as any of the coating compositions discussed above in reference to FIG. 1.

The tapes 98, 100, and 102 are unwound from rollers 92, 94, and 96, and pass through a gap between a first set of forming rollers 106. The first set of forming rollers 106 may exert a pressure against tapes 98, 100, and 102. The tapes 98, 100, and 102 also may pass through a second set of forming rollers 106, which also may exert a pressure against tapes 98, 100, and 102. In some examples, the temperature of system 90, or at least the portion of system 90 near first set of forming rollers 106 and second set of forming rollers 108, may be maintained above the brittle to ductal transition temperature for a constituent of the tape, such as, for example, silicon (e.g., silicon metal) or the silicon alloy. The first set of forming rollers 106 and the second set of forming rollers 108 thus may press tapes 98, 100, and 102 together to form multilayer tape 104. In some examples, multilayer tape 104 may be sufficiently flexible to be rolled on roller 110 without damage to multilayer tape 104.

In some examples, multilayer tape 104 may be subsequently cut or otherwise formed into different sizes or shapes, e.g., shapes substantially conforming to the geometry of the component (e.g., component 10) on which the piece of multilayer tape 104 is to be used (e.g., as coating system 14). In some examples, a multilayer tape 104 may not be sufficiently flexible 104 to be manipulated into different shapes, and, instead, may be formed in a mold corresponding to the shape of the joint in which the piece of multilayer tape is to be used.

Figure 5:
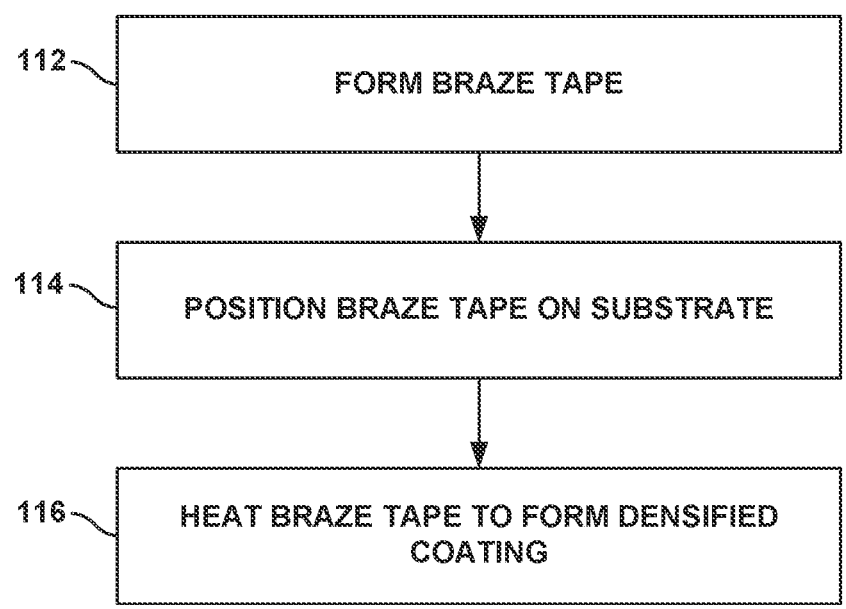
FIG. 5 is a flow diagram illustrating an example technique for applying a tape cast coating onto a component.

FIG. 5 is a flow diagram illustrating an example technique for applying a tape cast coating onto a component. The technique of FIG. 5 will be described with reference to the component 40 of FIG. 2 and tape casting system 70 of FIG. 4 for ease of description, although the technique may be used to form other components (e.g., component 10 of FIG. 1) or with other systems. Additionally, other techniques may be used to form components 10 and 40.

The technique of FIG. 5 includes forming a tape (e.g., pre-sintered coating system 14) defining at least one layer 46 that includes a first segment 50A and a second segment 50B (112). The first segment 50A includes a first coating material, such as any of the coating materials discussed above in reference to FIG. 1. The second segment 50B includes a second coating material, such as any of the coating materials discussed above in reference to FIG. 1, that is difference from the first coating material. First segment 50A and second segment 50B may be disposed substantially in the same plane, e.g., within tolerances of common casting techniques. At least a portion of the second segment 50B is directly adjacent to at least a portion of the first segment 50A. In some examples, layer 16 may include at least one layer comprising a silicon-containing braze material.

In some examples, forming the tape may include applying, by a tape casting system 70, a first slurry containing the first coating material to a carrier film 74. The technique also may include applying, by the tape casting system 70, a second slurry containing the second braze material to the carrier film 74 adjacent to the first slurry. The technique may include, before or after applying the second slurry, drying the first slurry. The technique may include, before, after, or simultaneously with drying the first slurry, drying the second slurry for form the tape.

The technique illustrated in FIG. 5 also includes positioning the tape on a surface 43 of a substrate 42 (114). In some examples, positioning the tape may include positioning the tape on a portion of substrate 12 that would be shadowed in a thermal spray process. In some examples, positioning the tape may include positioning the tape on a portion of substrate 12 to improve a mechanical and/or chemical property of component 10.

In some examples, forming the tape (114) may include at least partially sintering at least one of the first coating material or the second coating material. The technique then may include infiltrating cracks in the partially sintered first or second coating material with a third coating material. The third coating material may be the same as the first or second coating material, or a different material. The technique also may include sintering the infiltrated tape to at least partially fill a porosity or cracks in the tape.

The technique illustrate in FIG. 5 also includes heating the tape to sinter a constituent of at least one of the first coating material and the second coating material to form a densified coating on surface 43 of substrate 42 (116). In some examples, heating the tape may include heating the tape and/or substrate 10 in a box furnace. In some examples, heating the tape may include heating the tape using a hot isostatic press. Heating the tape may include heating the tape and/or substrate 10 to a temperature between about 1200° C.

and about 1600° C., such as between about 1327° C. and about 1427° C. In some examples, molten silicon-containing material may flow into or between adjacent layers 46 and/or segments 50. In some examples, molten silicon-containing material may react with carbon, e.g., from an organic binder system in layers 46 and/or segments 50 to form silicon carbide.

In some examples, the technique may include applying pressure to compress coating system 44 onto surface 43 of substrate 44. For example, a clamp, a press, or similar device may be used to apply pressure to coating system 44 during heating (116), which may transmit the force to coating system 44 and compress coating system 44.

Various examples have been described. These and other examples are within the scope of the following claims.

What is claimed is:

1. A method comprising:
    forming a tape defining at least one layer extending in a plane, the at least one layer comprising:
        a first segment comprising a first coating material; and
        a second segment comprising a second coating material, wherein a portion of the second segment in the plane is adjacent to a portion of the first segment in the plane; positioning the tape on a surface of a substrate;
    partially sintering at least one of the first coating material or the second coating material; infiltrating cracks in the partially sintered first or second coating material with a third coating material to form an infiltrated tape: and
    sintering the infiltrated tape.

2. The method of claim 1, wherein forming the tape comprises:
    applying, by a tape casting system, a first slurry containing the first coating material to a carrier film;
    applying, by the tape casting system, a second slurry containing the second coating material to the carrier film adjacent to the first slurry;
    drying the first slurry; and
    drying the second slurry to form the tape.

3. The method of claim 1, wherein the third coating material comprises the first coating material or the second coating material.

4. The method of claim 1, wherein the third coating material is different than the first coating material or the second coating material.

5. The method of claim 1, wherein sintering the tape comprises heating the tape using a box furnace or a hot isostatic press.

6. The method of claim 1, wherein the at least one layer comprises a first layer, wherein forming the tape further comprises forming a second layer, and wherein the first layer is formed on the second layer.

7. The method of claim 6, wherein the second layer comprises a bond coat.

8. The method of claim 1, wherein the substrate comprises a ceramic matrix composite (CMC).

9. A method comprising:
    forming a tape defining at least one layer extending in a plane, the at least one layer comprising:
        a first segment comprising a first coating material; and
        a second segment comprising a second coating material, wherein a portion of the second segment in the plane is adjacent to a portion of the first segment in the plane;
    positioning the tape on a surface of a substrate, wherein the plane of the layer of the tape is parallel to the surface of the substrate;
    partially sintering at least one of the first coating material or the second coating material;
    infiltrating cracks in the partially sintered first or second coating material with a third coating material to form an infiltrated tape; and
    sintering the infiltrated tape.

10. The method of claim 9, wherein the third coating material comprises the first coating material or the second coating material.

11. The method of claim 9, wherein the third coating material is different than the first coating material or the second coating material.

12. The method of claim 9, wherein sintering the tape comprises heating the tape using a box furnace or a hot isostatic press.

13. The method of claim 9, wherein the at least one layer comprises a first layer, wherein forming the tape further comprises forming a second layer, and wherein the first layer is formed on the second layer.

14. The method of claim 13, wherein the second layer comprises a bond coat.

15. The method of claim 9, wherein the substrate comprises a ceramic matrix composite (CMC).

* * * * *